United States Patent [19]
Rognon

[11] 4,196,882
[45] Apr. 8, 1980

[54] DOUBLE SUCTION CUP HOLDER WITH VACUUM CONTROL VALVE

[76] Inventor: Robert Y. Rognon, P. O. Box 829, White Mountain Lake, Ariz. 85912

[21] Appl. No.: 851,050

[22] Filed: Nov. 14, 1977

[51] Int. Cl.² ............................................. F16B 47/00
[52] U.S. Cl. .................................. 248/206 R; 248/363
[58] Field of Search .................. 248/206 R, 362, 363; 137/625.47; 294/64 R, 64 A, 64 B

[56] References Cited

U.S. PATENT DOCUMENTS

| | | | |
|---|---|---|---|
| 1,448,690 | 3/1923 | Hetzer et al. | 294/64 R |
| 2,377,416 | 6/1945 | Haberstump | 248/363 X |
| 2,385,977 | 10/1945 | Farmer | 248/206 R |
| 2,565,793 | 8/1951 | Weismantel | 248/206 R X |
| 2,650,792 | 9/1953 | Marco | 137/625.4 X |
| 2,777,141 | 1/1957 | Nye | 248/206 R X |
| 3,129,971 | 4/1964 | Kobler | 294/64 R |
| 3,720,433 | 3/1973 | Rosfelder | 294/64 R |
| 3,879,005 | 4/1975 | Flick | 248/206 R |
| 4,019,536 | 4/1977 | Dong et al. | 137/625.41 |

FOREIGN PATENT DOCUMENTS

| | | | |
|---|---|---|---|
| 71950 | 12/1950 | Denmark | 248/362 |
| 1144113 | 4/1957 | France | 248/206 R |
| 1,468,402 | 12/1966 | France | 248/363 |

*Primary Examiner*—Lawrence J. Staab
*Attorney, Agent, or Firm*—Howard I. Podell

[57] ABSTRACT

A double suction cup holder in which the two suction cups are connected by a stem has a longitudinal air passageway through the stem connecting the two cups. A diametrical opening traverses the passageway and has a valve member rotatably mounted therein which has inter-communicating longitudinal and diametrical bores. When the valve is turned so that its diametrical bore communicates with the air passageway, the vacuum in the cups is spoiled releasing the holder.

1 Claim, 4 Drawing Figures

DOUBLE SUCTION CUP HOLDER WITH VACUUM CONTROL VALVE

FIELD OF THE INVENTION

This invention relates generally to vacuum holders having improved, novel vacuum spoiling means.

STATEMENT OF PRIOR ART

The prior art, as exemplified by U.S. Pat. Nos. 1,228,649; 2,711,765; 3,716,307; 1,845,196; and 2,501,942 is generally illustrative of various devices of this type. While such devices are generally acceptable for their intended purpose they have not proven to be entirely satisfactory in that they are either complex and expensive to manufacture, or bulky and inconvenient to use, or require unusual skill and/or dexterity to operate. As a result of the shortcomings of the prior art, typified by the above, there has developed and continues to exist a substantial need for devices of the character described. Despite this need, and the efforts of many individuals and companies to develop such devices, a satisfactory device meeting this need has heretofore been unavailable.

The principal object of this invention is to provide a novel double suction cup holder.

Another object is to provide improved, novel vacuum spoiling means for suction cup holders of the character described.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

SUMMARY OF THE INVENTION

This invention resides in a double suction cup holder in which the two suction cups are connected by a stem has a longitudinal air passageway through the stem connecting the two cups. A diametrical opening traverses the passageway and has a valve member rotatably mounted therein which has inter-communicating longitudinal and diametrical bores. When the valve is turned so that its diametrical bore communicates with the air passageway, the vacuum in the cups is spoiled releasing the holder.

BRIEF DESCRIPTION OF THE DRAWING

In the accompanying drawing, in which is shown one of the various possible illustrative embodiments of this invention, wherein like reference character identify the same or like parts.

DESCRIPTION OF THE PREFERRED EMBODIMENT

Figure 1:
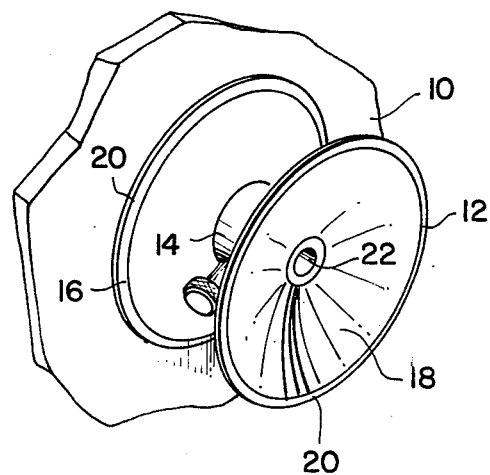
FIG. 1 is a perspective view of the invention use thereof on a vertical surface.
Figure 2:
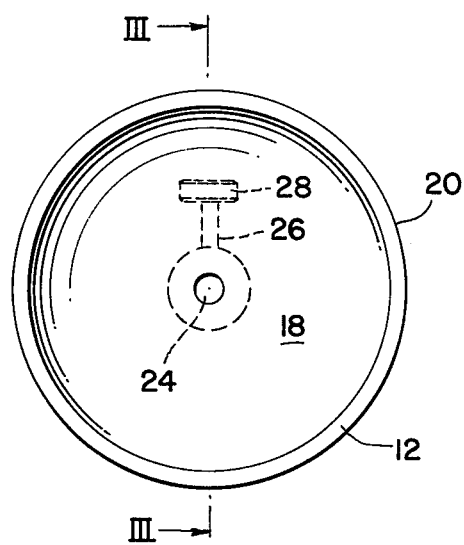
FIG. 2 is a bottom plan view partly in section of one of the suction cups.

With reference to the drawing, there is shown and illustrated a double suction cup holder constructed in accordance with the principles of the invention and designated generally by reference character 10. The particular holder represented includes a first suction cup 12 connected by stem 14 to an identical second suction cup 16. Both cups are made of rubber or rubber-like material including certain plastic and resilient materials. Both cups 12 and 16 are arcuate, having a spherical concavity 18 terminating in peripheral lip 20. Stem 14 is circular and cylindrical in shape and, as shown in the drawings, is coaxial with the cups 12 and 16.

Figure 3:
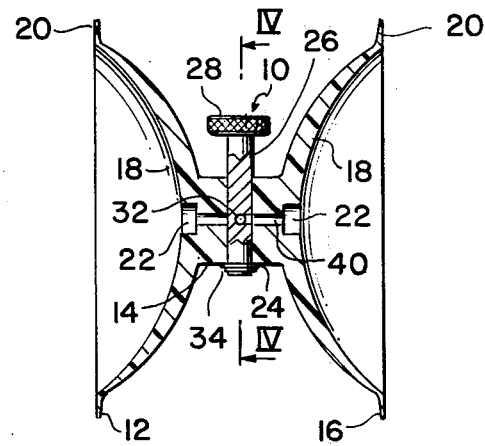
FIG. 3 is a cross-sectional view through line III—III of FIG. 2.

As shown in FIG. 3, stem 14 has a circular cylindrical bore 40 extending axially therein and terminating in enlarged sections 22 in the centers of each cup. A diamerically extending opening 24 intersects bore 40.

Figure 4:
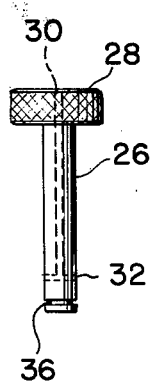
FIG. 4 is a cross-sectional view taken along line IV—IV and showing the valve means actuator.

As shown in FIGS. 3 and 4 a plastic or hard rubber valve member 26 having a knurled turning knob 28 is provided. Member 26 is rotatably mounted in opening 24. Member 26 has an axial bore 30 terminating in a cylindrical circular diametrical hole 32. The lower end of member 26 is secured to the stem by washer 34 fitting in groove 36 thereof so that member 26 can rotate while being substantially in hermetic engagement with the stem 14.

It will be readily appreciated that when valve member is in the position shown in FIG. 3, with its bore 32 not in communication with axial bore 40 of stem 14, the vacuum in both cups will endure. When the member 26 is turned to place bores 32 and 40 in communication, the vacuum will be spoiled.

The holder of this invention can be used to secure objects such as memo pads to any flat surface whether it be vertical, horizontal or diagonal. Depending on the size and/or weight of the object, a number of holders may be required such as one in each corner of the object.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use. Its advantages are easily seen.

It is thought that persons skilled in the art to which this invention relates will be able to obtain a clear understanding of the invention after considering the foregoing description in connection with the accompanying drawing. Therefore, a more lengthy description is deemed unnecessary.

It is to be understood that various changes in shape, size and arrangement of the elements of this invention as claimed may be resorted to in actual practice, if desired.

Having thus described the invention, what is claimed as new and to be secured by Letters Patent is:

1. A double suction cup vacuum holder comprising first and second arcuate suction cups, each having a spherical concavity with a flexible circular lip around said concavity; a connecting stem coaxial with said cups; a circular longitudinal air passageway extending through said stem and communicating with the interior of each cup; a diametrically extending bore in said stem intersecting said passageway; a valve member rotatably mounted in said bore; said member having intersecting axial and diametrical bores therein, with the axial bore extending in the valve member to an unobstructed opening leading to the exterior of the device, so as to spoil a vacuum in said cups when the diametrical bore of the valve member is placed in communication with said air passageway, with said valve member acting to block passage of air in the longitudinal passageway between the interiors of the two suction cups when the valve member is rotated to a position in which the said diametrical bore is not in communication with said air passageway.

* * * * *